(12) United States Patent
Simpson

(10) Patent No.: US 6,606,162 B1
(45) Date of Patent: Aug. 12, 2003

(54) NETWORK PRINTER GROUPS

(75) Inventor: Shell S. Simpson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/359,145

(22) Filed: Jul. 21, 1999

(51) Int. Cl.[7] .......................... G06F 15/00; G06F 13/00
(52) U.S. Cl. ...................................... 358/1.15; 358/1.4
(58) Field of Search ................................. 358/1.15, 1.4

(56) References Cited

U.S. PATENT DOCUMENTS

| | | | | |
|---|---|---|---|---|
| 5,467,434 A | * | 11/1995 | Hower et al. | ............... 358/1.15 |
| 5,580,177 A | * | 12/1996 | Gase et al. | .................... 400/61 |
| 5,692,111 A | * | 11/1997 | Marbry et al. | ............. 358/1.15 |
| 6,088,120 A | * | 7/2000 | Shibusawa et al. | ......... 358/1.15 |
| 6,288,790 B1 | * | 9/2001 | Yellepeddy et al. | ........ 358/1.15 |
| 6,348,971 B2 | * | 2/2002 | Owa et al. | .................. 358/1.15 |
| 6,453,268 B1 | * | 9/2002 | Carney et al. | .............. 702/186 |

* cited by examiner

*Primary Examiner*—Edward Coles
*Assistant Examiner*—Alan Rahimi

(57) ABSTRACT

One or more printers on a network are grouped together to form a printer group. A printer group server contains a database of the printer groups on the network. The printer group database includes a list of printers assigned to each printer group in the database. The printer group server communicates with a printer group client and a print server. The printer group client subscribes to one or more of the printer groups. The printer group client resides on a print client device and manages a set of print queues on the print client device. Each printer queue represents one of the printers in the printer groups to which the printer group client subscribes. A printer group is updated by making changes to the printers in the printer group and updating the printer group database to reflect the changes. A change in the printer group database initiates a change in the print queues managed by the printer group client for printer group clients that subscribe to the updated printer group.

12 Claims, 3 Drawing Sheets

NETWORK PRINTER GROUPS

FIELD OF THE INVENTION

This invention relates in general to printers and, more particularly, to a system and method for sharing printers on a network.

BACKGROUND OF THE INVENTION

Often printers are shared on a network by more than one print client. A print client is any machine, device, or computers that sends a print job to a printer. In order for a print client to send a print job to a printer, the print client must first be set up to use the printer. Setting up a print client to use a printer involves adding to the print client a print queue for the printer and ensuring the print client has all necessary drivers for the printer.

When many printers are available on a network, it is often desirable for each print client to be able to choose among several printers when sending a print job. However, since each print client tends to use only a few of the available printers, setting up each print client to use all of the available printers is usually unnecessary. Typically, each print client is set up for only a few of the available printers. It is often convenient to set up print clients physically located near one another to use the same few printers.

Conventionally, when a printer is added, replaced, or removed from a network, each print client impacted by the change must be updated manually. Impacted print clients are those which are set up to use a replaced or removed printer and those which will be set up to use an added printer. Updating the print client includes ensuring that the print client has a print queue for the printer and the print client has all necessary drivers for the printer. Updating each impacted print client manually is time consuming and potentially error prone.

SUMMARY OF THE INVENTION

According to principles of the present invention, one or more printers on a network are grouped together to form a printer group. A printer group server contains a database of the printer groups on the network. The printer group database includes a list of printers assigned to each printer group in the database. The printer group server communicates with a printer group client and a print server. The printer group client subscribes to one or more of the printer groups. The printer group client resides on a print client device and manages a set of print queues on the print client device. Each printer queue represents one of the printers in the printer groups to which the printer group client subscribes. A printer group is updated by making changes to the printers in the printer group and updating the printer group database to reflect the changes. A change in the printer group database initiates a change in the print queues managed by the printer group client for printer group clients that subscribe to the updated printer group.

According to further principles of the present invention, an operating system of the print client is discovered and only printers with drivers that support an operating system matching the print client's operating system are presented to the print client for subscription.

Other objects, advantages, and capabilities of the present invention will become more apparent as the description proceeds.

DETAILED DESCRIPTION OF THE INVENTION

Figure 1:
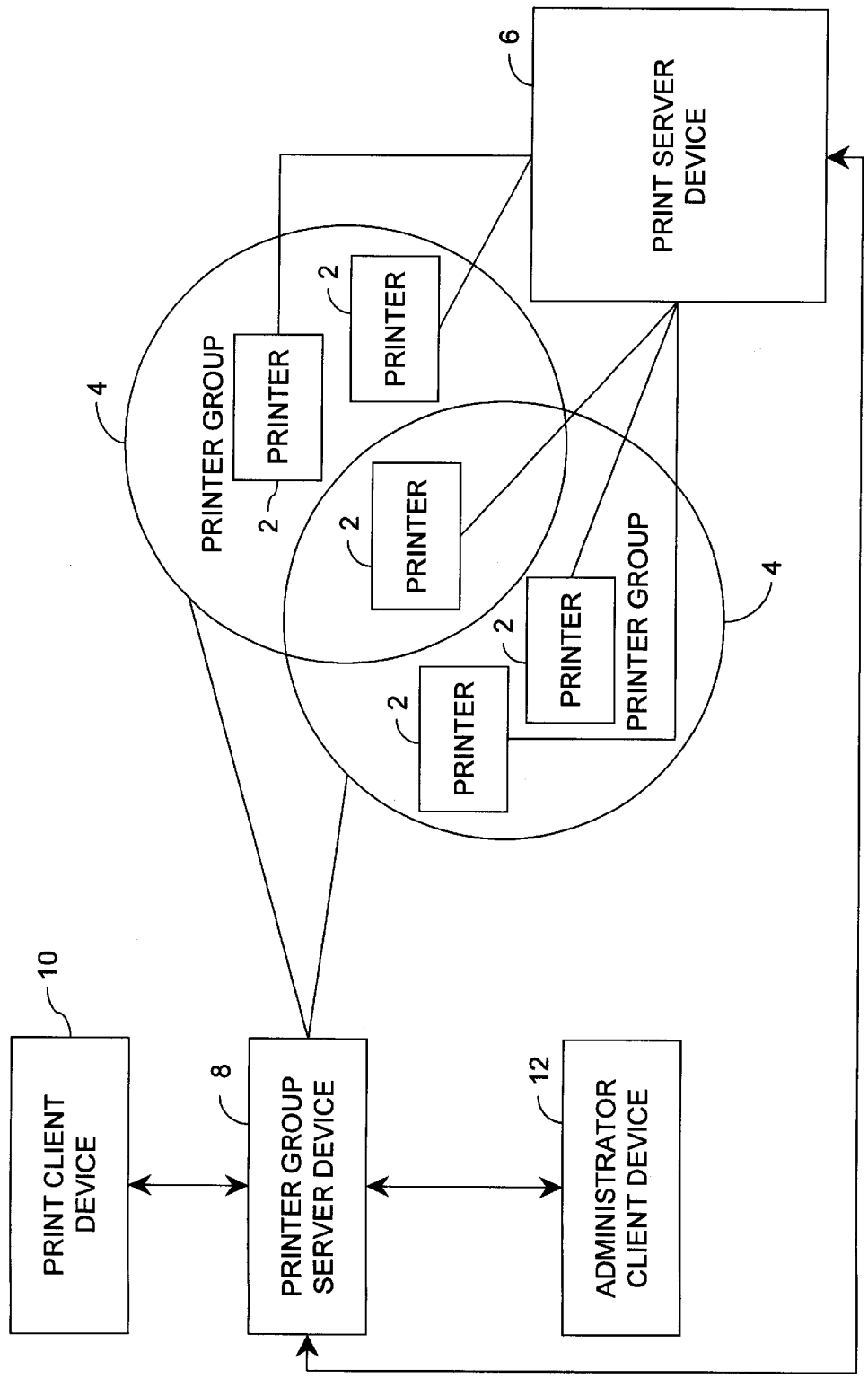
FIG. 1 is a block diagram illustrating a system of the present invention.

FIG. 1 illustrates a system of the present invention for sharing printers on a network. Printers 2 are assembled into printer groups 4. Each printer 2 has a network address for locating the printer on a network. Printer groups 4 each include at least one printer 2. A printer 2 may be included in more than one printer group 4. A print server device 6 serves the printers 2. Print server device 6 communicates with a print group server device 8. Print server device 6 and print group server device 8 may be the same device.

A print client device 10 and an administrator client device 12 both communicate with printer group server 8. Print client device 10 is any machine, device, or computers capable of sending a print job to a printer 2 and communicating with printer group server 8. Administrator client device 12 is any device capable of interacting with printer group server 8 to modify information or data stored on printer group server device 8. Print client device 10 and administrator client device 12 may be the same device.

Figure 2:
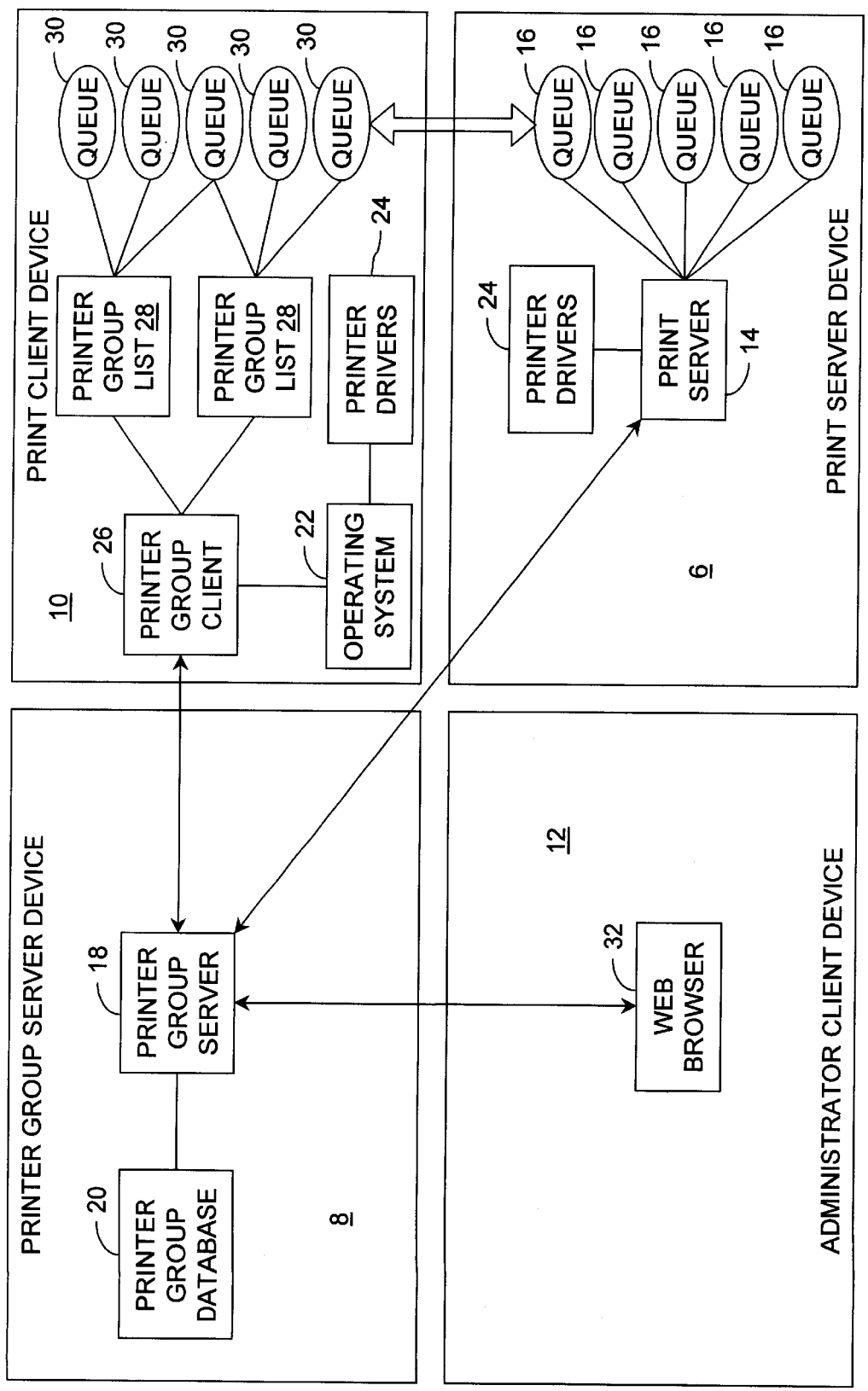
FIG. 2 is a more detailed block diagram illustrating selected devices of the system of the present invention.

FIG. 2 is a more detailed diagram of print server device 6, printer group server device 8, print client device 10, and administrator client device 12. Running on print server device 6 is a print server application 14 for serving printers 2. Shared printer queues 16 reside on print server device 6. Each shared printer queue 16 represents a printer 2. Print server device 6 manages shared printer queues 16.

Running on printer group server device 8 is a printer group server 18. Printer group server 18 manages a printer group database 20. Printer group database 20 includes a record for each printer group 4. Each printer group record includes a list of each of the printers 2 in a printer group 4 and a record of the network address for each printer 2.

Running on print client device 10 is an operating system 22. Operating system 22 interacts with a printer driver 24 to create a print job to be printed on a printer 2. Typically, each type of printer 2 requires a different printer driver 24. Also, each different operating system 22 usually requires a different printer driver 24.

Also running on print client device 10 is a printer group client 26. Printer group client 26 is an interface between printer group server 18 and print client device 10. Printer group client 26 subscribes to at least one printer group 4. Printer group client 26 creates and maintains a printer group list 28 for each printer group 4 subscribed to by printer group client 26.

Printer group client 26 also manages a set of operating system print queues 30 for each printer group 4 subscribed to by printer group client 26. Each operating system printer queue 30 represents a printer 2 and is linked to one of the shared printer queues 16. Printer group client 26 uses the address of each printer 2 to establish the operating system printer queues 30 for each printer 2 in each subscribed printer group 4.

Stored on print server device 6 or otherwise accessible by printer client device 10 are printer drivers 24 for each printer 2. Printer drivers 24 are also accessible by printer group server 18. Each printer driver 24 operates on a specific operating system 22 for one or more printers 2. For each printer 2, a record is made in printer group database 20 indicating for which operating systems 22 a printer driver 24 is accessible by printer group server 18.

Administrator client machine 12 includes a web browser 32 for accessing printer group server 18 to make changes to printer group database 20. Although changes may be made to printer group database 20 using any means, web browser 20 provides a convenient means for remotely administrating printer group database 20 and printer group server 18.

Figure 3:
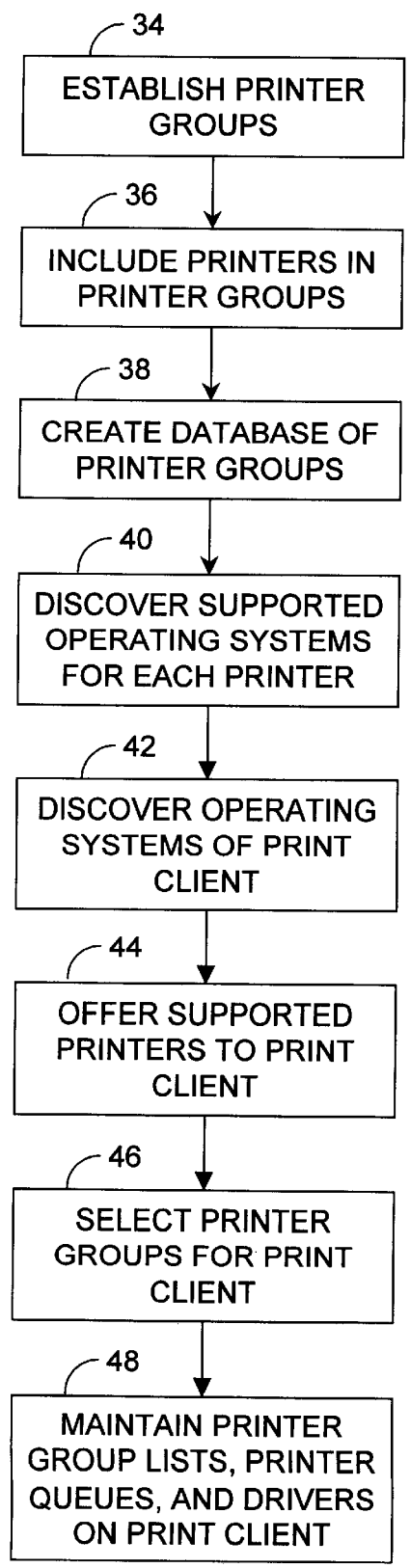
FIG. 3 is a flow chart illustrating one embodiment of a method of the present invention.

Referring now to FIG. 3, a flow chart illustrates one method for practicing the present invention. Although the flow chart illustrates one order for carrying out a method of the present invention, many of the steps illustrated may be carried out in any order other than what is shown.

At least one printer group 4 is established 34 and at least one printer 2 is included 36 in the printer group 4. Next, printer group database 20 is created 38. Printer group database 20 contains a record for each printer group 4 and each printer 2. Printer group database 20 may also include a record for each printer 2 indicating each operating system 22 for which a printer driver 24 is accessible by printer group server 18. Providing the record of accessible drivers allows printer group server 18 to selectively offer only printers 2 to printer group client 26 if a printer driver 24 is available for the operating system 22 of print client device 10. For each printer, if a printer driver 24 is available for an operating system 22, the printer 2 is supported for the operating system 22.

For each printer 2 in printer group database 20, the supported operating systems 22 are discovered 40. Next, the operating system 22 of the print client device is discovered 42. Only the supported printers 2 recorded in printer group database 20 are offered 44 to printer group client 26 for subscription.

From those printer groups 4 recorded in printer group database 20, at least one printer group 4 is selected 46 for the print client device 10. Printer group client 26 subscribes to the selected printer group 2. For each subscribed printer group 2, a printer group list 28 and operating system printer queue 30 for each printer in the subscribed printer group are maintained 48 on print client device 10.

Maintaining 48 printer group lists 28 and operating system printer queues 30 includes creating and updating the printer group lists 28 and operating system printer queues 30.

Printer group lists 28 and operating system printer queues 30 are updated when changes are made to printer group database 20. Changes are made to printer group database 20 by administrator client machine 12 when the composition of a printer group 4 is changed. The composition of a printer group 4 changes when a printer 2 is added, removed, or replaced with a different type of printer 2. A printer 2 is a different type when it is a different brand or model than the printer 2 it replaces.

In one embodiment, print client device 10 contacts printer group server device 8 at startup and requests the list of printers 2 in a printer group 4. If the list of printers 2 in the printer group 4 matches the printer group list 28, no further action need be taken. If the list of printers 2 does not match the printer group list 28, printer group client 26 adds, deletes, and replaces operating system printer queues 30 as necessary.

In another embodiment, a change to a printer group 4 in the printer group database 20 initiates a notification to each of the printer group clients 26 subscribing to the changed printer group 4.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. A method for sharing printers on a network, the method comprising:
   (a) establishing at least one printer group;
   (b) including at least one printer in the at least one printer group;
   (c) creating a printer group database reflecting each printer included in each printer group;
   (d) selecting one or more of the at least one printer groups for use by a print client;
   (e) maintaining on the print client, a print queue for each printer included in each of the selected printer groups; and,
   (f) updating the printer queues of the print client to reflect changes made to the printer group database.

2. The method of claim 1 further including:
   (a) discovering for each printer which print client operating systems are supported; and,
   (b) providing in the printer group database each print client operating system supported for each printer.

3. The method of claim 2 further including:
   (a) discovering an operating system of the print client;
   (b) comparing the operating system of the print client with the supported operating systems for each printer; and,
   wherein maintaining a print queue for each printer includes maintaining a print queue for each printer having a supported operating system matching the operating system of the print client.

4. The method of claim 1 further including maintaining on the print client, drivers necessary for processing print jobs for each printer included in each of the selected printer groups.

5. A system for sharing printers on a network, the system comprising:
   (a) at least one printer group including at least one printer;
   (b) a printer group server including a database of printer groups having a list of each printer included in each printer group;
   (c) at least one print client in communication with the printer group server, each print client subscribed to one or more of the at least one printer groups, each print client including a print queue for each printer listed in the printer group database for each of the subscribed printer groups; and,
   (d) means for updating the printer queues of each print client to reflect changes made to the printer group database.

6. The system of claim 5 further including at least one print server serving each of the printers of the at least one printer group, the printer group server communicating with the print server.

7. The system of claim 5 further including:
   (a) means for discovering for each printer which print client operating systems are supported; and,
   (b) means for providing in the printer group database each print client operating system supported for each printer.

8. The system of claim 5 further including means for maintaining on the print client, drivers necessary for processing print jobs for each printer included in each of the selected printer groups.

9. A system for sharing printers on a network, the system comprising:
   (a) at least one printer group including at least one printer;
   (b) a printer group database having an entry for each printer in each printer group;
   (c) a print client;
   (d) means for selecting one or more of the at least one printer groups for use by the print client;
   (e) means for maintaining on the print client, a print queue for each printer included in each of the selected printer groups; and,
   (f) means for updating the printer queues of the print client to reflect changes made to the printer group database.

10. The system of claim 9 further including:
   (a) means for discovering for each printer which print client operating systems are supported; and,
   (b) means for providing in the printer group database each print client operating system supported for each printer.

11. The system of claim 10 further including:
   (a) an operating system installed on the print client;
   (b) means for discovering the operating system on the print client;
   (c) means for comparing the operating system on the print client with the supported operating systems for each printer; and,
   wherein the means for maintaining a print queue for each printer includes means for maintaining a print queue for each printer having a supported operating system matching the operating system on the print client.

12. The system of claim 9 further including:
   (a) drivers necessary for processing print jobs for each printer; and,
   (b) means for maintaining on the print client, the printer drivers necessary for processing print jobs for each printer included in each of the selected printer groups.

* * * * *